United States Patent [19]
Dega

[11] 3,880,555
[45] Apr. 29, 1975

[54] CORNER SEAL SPRING FOR ROTARY ENGINE

[75] Inventor: Robert L. Dega, Mount Clemens, Mich.

[73] Assignee: General Motors Corporation, Detroit, Mich.

[22] Filed: Jan. 14, 1974

[21] Appl. No.: 432,892

[52] U.S. Cl. ............................... 418/121; 418/142
[51] Int. Cl. ............................................. F01c 19/10
[58] Field of Search .................... 418/121, 120, 142

[56] References Cited
UNITED STATES PATENTS

| | | | |
|---|---|---|---|
| 3,127,095 | 3/1964 | Froede | 418/121 |
| 3,286,912 | 11/1966 | Tado | 418/120 |
| 3,711,229 | 1/1973 | Kurio | 418/121 |

FOREIGN PATENTS OR APPLICATIONS

| | | | |
|---|---|---|---|
| 1,185,875 | 1/1965 | Germany | 418/121 |

Primary Examiner—C. J. Husar
Assistant Examiner—O. T. Sessions
Attorney, Agent, or Firm—Ronald L. Phillips

[57] ABSTRACT

A leaf spring for biasing the corner seal in a rotary engine has a shape that provides three-point contact with the seal and two-point contact with the rotor on which it is mounted and also has a tang that engages a hole in a corner seal to prevent relative rotation therebetween.

3 Claims, 5 Drawing Figures

CORNER SEAL SPRING FOR ROTARY ENGINE

This invention relates to a corner seal spring for a rotary engine and more particularly to such a spring that provides balanced off-center loading on the corner seal and is also positively prevented from rotating relative thereto.

In current commercial rotary engines, it is common practice to have a gas sealing grid on the rotor which includes corner seals that provide seal junctures between apex seals and side seals. In such an arrangement, the springs which bias the corner seals against the engine's stationary side walls normally produce unbalanced off-center loading which may bind the corner seals and, in addition, may turn relative to the corner seals and interfere with free apex seal movement.

An object of the present invention is to provide a new and improved corner seal spring for a rotary engine.

Another object is to provide a corner seal spring for a rotary engine that provides balanced off-center loading on the corner seal and is prevented from rotating relative to the corner seal to avoid interference with apex seal movement.

Another object is to provide a corner seal spring for a rotary engine that has three-point contact with the seal and two-point contact with the rotor on which it is mounted so as to provide balanced off-center loading on the corner seal to avoid binding of the corner seal and, in addition, has a tang that engages a hole in the corner seal to prevent relative rotation therebetween to prevent interference with apex seal movement.

These and other objects of the present invention will become more apparent from the following description and drawing in which.

Figure 1:
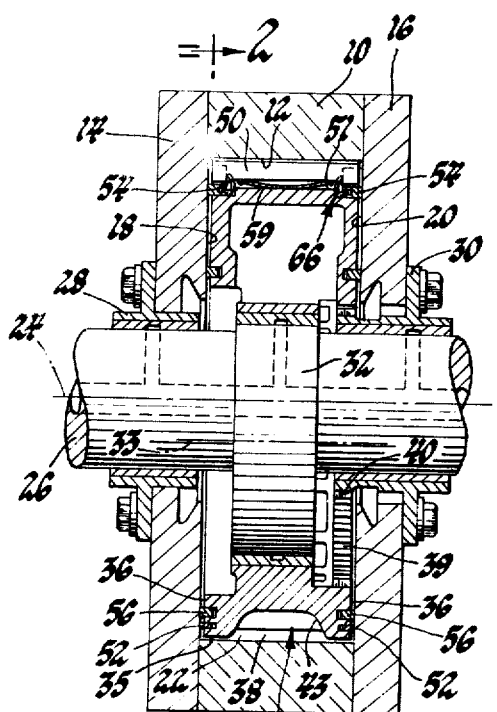
FIG. 1 is an elevational view with parts in section of a rotary combustion engine having corner seal springs according to the present invention.
Figure 2:
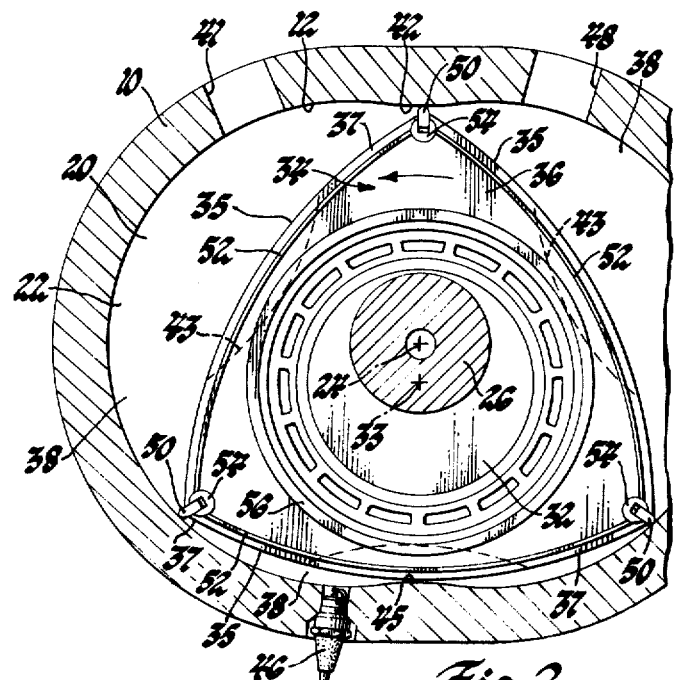
FIG. 2 is a view of the engine taken along the line 2—2 in FIG. 1.

The corner seal spring according to the present invention is for use in rotary engines including rotary combustion engines, compressors, pumps and the like. Referring to FIG. 1, the rotary engine may, for example, be an internal combustion engine of current production type having a stationary outer body comprising a rotor housing 10 having an inwardly facing inner peripheral wall 12 and a pair of end housings 14 and 16 having parallel, oppositely facing, spaced, inner end walls 18 and 20, respectively. The housing parts are rigidly secured together by bolts, not shown, with the inner walls 12, 18 and 20 cooperatively providing a cavity 22. Referring to FIG. 2, the peripheral wall 12 is in the shape of a two-lobe epitrochoid or a curve parallel thereto whose centerline is indicated at 24. A crankshaft 26 extends through the cavity 22 and is rotatably supported in bearing lined collars 28 and 30 that are bolted to the end housings 14 and 16, respectively, as shown in FIG. 1; the crankshaft axis being coincident with the centerline 24, parallel to the peripheral wall 12 and perpendicular to the end walls 18 and 20. The crankshaft 26 is provided in cavity 22 with an eccentric 32 whose centerline 33 parallels the crankshaft axis 24. A rotor 34 has a central hub having a bearing press-fitted therein which is received on the eccentric 32 whereby the rotor 34 is supported in cavity 22 for rotation about the eccentric's centerline 33 which is thus the rotor's axis. The rotor 34 has the general shape of a triangle with three outwardly facing convex peripheral flanks or faces 35 which face the peripheral wall 12 and sides 36 which face the end walls 18 and 20; and as the rotor turns with respect to the peripheral wall 12 on the turning crankshaft 26 as will be described in more detail later, each of the rotor's corners 37 remains close to the peripheral wall 12 whereby the rotor faces 35 cooperate with the wall 12 and also with the end walls 18 and 20 to define three variable volume working chambers 38 that are spaced around the rotor and move with the rotor within the housing as the rotor rotates about its axis while planetating with respect to the crankshaft axis.

With the two-lobed peripheral wall 12 and the three corner rotor 34, each of the working chambers 38 sequentially expands and contracts between minimum and maximum volume during each rotor revolution in fixed relation to the housing by forcing the rotor to rotate at one-third the speed of the crankshaft. This is accomplished by gearing comprising an internal tooth gear 39 which is concentric and integral with rotor 34. The gear 39 meshes with an external tooth gear 40 which is received with clearance about and is concentric with the crankshaft 26 and is made stationary by being formed integral with the right-hand collar 30 as shown in FIG. 1. The gear 39 has 1½ times the number of teeth as the gear 40 to provide the required speed ratio of 3:1 between the crankshaft and rotor.

A combustible air-fuel mixture from a suitable carburetor arrangement, not shown, is made available to working chambers 38 by an intake port 41 in rotor housing 10 as shown in FIG. 2. Passage 41 opens to the cavity 22 on the leading side of cusp 42 of the peripheral wall 12 relative to the direction of rotor rotation indicated by the arrow in FIG. 2. A single channel or recess 43 is provided in the center of each chamber face of the rotor to provide for the transfer of working gases past the peripheral wall's other cusp 45 when a rotor face is at or near its top-dead-center position, as shown in FIG. 2, so that the chambers are not divided by the cusp 45 at the time when combustion is to occur therein. A spark plug 46 is mounted in the rotor housing 10 adjacent the cusp 45 with its electrodes exposed to the working chambers. As the rotor planetates, the working chambers successively draw in fuel mixture as the leading rotor corners pass the intake port 41. The trailing corner of the rotor for each chamber then closes this chamber to the intake port whereafter the fuel mixture is thus trapped and then compressed and when the rotor face of this chamber is in the vicinity of top-dead-center, this mixture is ignited at the completion of the compression phase, there being provided a suitable ignition system, not shown, for providing voltage to the spark plug at the proper time. Upon ignition of the mixture in each working chamber the peripheral wall takes the reaction forcing the rotor to continue turning while the gas is expanding. The leading rotor corner of each working chamber eventually traverses an exhaust port 48 in the rotor housing on the trailing side of the cusp 42 whereby the exhaust products are then expelled to complete the cycle.

Figure 4:
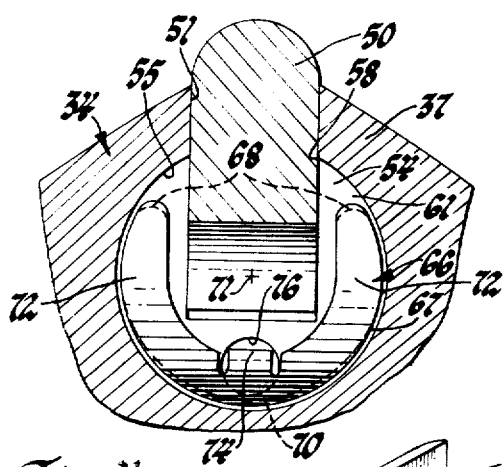
FIG. 4 is an enlarged view of one of the corner seal springs and corner seals taken along the line 4—4 in FIG. 3.
Figure 3:
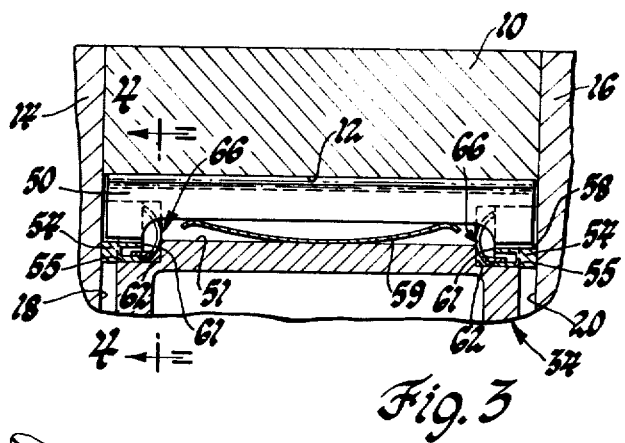
FIG. 3 is an enlarged view of one corner of the rotor in FIG. 1 showing the corner seal springs.
Figure 5:
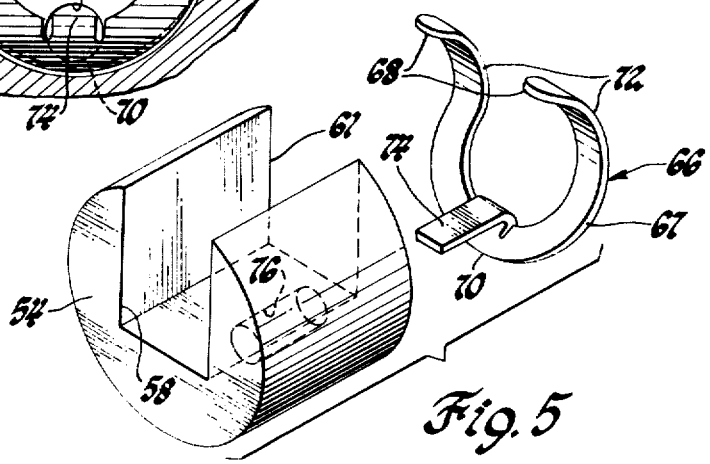
FIG. 5 is an enlarged exploded view of one of the corner seal springs and the corner seal it biases.

Sealing of the chambers 38 for such four-cycle internal combustion engine operation is mandatory and is typically provided by three apex seals 50 which are urged to engage peripheral wall 12. The apex seals 50 are rectangularly shaped in cross-section as shown in FIG. 4, and are each mounted in an axially extending radially outwardly facing rectangularly shaped slot 51 that is located at each apex or corner 37 of the rotor and extends the axial width thereof as best shown in FIG. 3. Three arcuate shaped side seals 52 are mounted in accommodating axially outwardly facing grooves in each rotor side 36 and extend adjacent a rotor face between two apex seals 50 and are urged to engage the opposing end wall. Furthermore, three cylindrically shaped corner seals 54 are each mounted in a cylindrical hole 55 in each rotor side with each corner seal urged to engage the opposing end wall and providing sealing between the adjacent ends of two side seals and one apex seal as shown in FIG. 2. In addition to this gas sealing arrangement there is also provided radially inward thereof a circular oil seal 56 that is mounted in an accommodating axially outwardly facing groove in each rotor side and is urged to engage the opposing end wall.

In the gas sealing arrangement at each corner of the rotor as best shown in FIG. 3, the two corner seal accommodating holes 55 are axially aligned with each other and are centered and contiguous with the apex seal slot 51. Furthermore, each of the corner seals 54 has a rectangularly shaped radially outwardly facing slot 58 which closely receives one end of the associated apex seal 50 to permit sliding movement therebetween in their mutually perpendicular directions of movement on the rotor while maintaining sealing therebetween. Typically, each of the apex seals 50 is biased by a leaf spring 59 fitting between the concave bottom thereof and the flat bottom of the apex seal slot 51 while the corner seals 54 are biased to continuously engage the respective end walls 18 and 20 by separate springs located between the flat C-shaped inner end 61 of the corner seals 54 and the flat C-shaped bottom 62 of the accommodating corner seal holes 55. Conventionally, the corner seal springs have a U-shape when viewed from the front and a γ-shape when viewed from the side and as a result they effect off-center loading on the corner seal. Furthermore, they may, unless restrained, rotate relative to the corner seal so that one of their ends engages one side of the apex seal thereby causing a mechanical restriction to free movement of the apex seal in the radial direction. Such known corner seal spring designs are disclosed in U.S. Pat. No. 3,711,229. It will also be understood that suitable spring means such as wave springs are provided to bias the side seals 52 and oil seals 56 against the end walls; however, such spring means form no part of the present invention.

According to the present invention there are provided corner seal springs 66 of the leaf type which are stamped from stainless steel sheet. The corner seal springs 66 are formed with a U-shape with a circular outer edge 67 when viewed from the front or back which is transverse to the apex seals 50 as shown in FIG. 4 and a C-shape when viewed from the side as shown in FIG. 3. In the assembled position the outer edge 67 of the corner seal spring 66 closely fits in the corner seal hole 55 to center the spring and the U-shape is intended to freely receive the apex seal 50 while two spring end portions 68 which are on opposite sides of the apex seal 50 and also a portion 70 at the crotch of the spring on this concave spring side engage the inner end 61 of the corner seal 54. The two apex portions 72 of the spring's C-shape on the opposite convex side of the spring engage the flat bottom 62 of the accommodating corner seal hole 55 on opposite sides of the apex seal slot 51 in the rotor. The three corner seal contacting points 68 and 70 of the corner seal spring 66 are at equal or substantially equal radial distances from the centerline 71 of the corner seal and are also equally or substantially equally angularly spaced thereabout while the two hole bottom contacting points 72 are also both equally or substantially equally radially and angularly spaced relative to the corner seal centerline 71 so that there is thus provided symmetrical loading; i.e., balanced off-center loading, on the corner seal which does not tend to bind or restrain the corner seal's movements. Furthermore, because of the symmetrical loading, there is no inherent tendency for the corner seal spring 66 to turn in the corner seal hole 55 relative to the corner seal 54. Nevertheless, positive prevention of such undesirable relative rotation between the corner seal and corner seal spring is prevented by a tang 74 that is formed on the spring in the crotch thereof and extends a substantial distance therefrom on the outboard or concave side parallel to the corner seal centerline 71 to engage in an eccentrically located hole 76 of corresponding width provided in the inner end 61 of the corner seal 54 directly beneath the corner seal's apex seal slot 58 and parallel to the corner seal centerline. Since any tendency would be for the corner seal spring 66 to turn about the centerline 71 of the corner seal 54, the tang 74 by its engagement in the eccentrically located hole 76 positively prevents such relative turning and thus prevents the ends 68 from digging into the sides of the apex seal 50.

The above described embodiment is illustrative of the invention which may be modified within the scope of the appended claims.

I claim:

1. In a rotary machine, a housing having an inwardly facing inner peripheral wall and a pair of spaced oppositely facing inner end walls, a rotor rotatably mounted in said housing having sides opposite said end walls and a plurality of corners that remain adjacent said peripheral wall as said rotor rotates, said rotor and said housing walls cooperatively defining a plurality of chambers separated by said rotor corners that expand and contract as said rotor rotates, each said rotor corner having an apex seal slot extending thereacross facing radially outwardly toward said peripheral wall, each said rotor side at each corner having a corner seal hole joining with one of said apex seal slots and facing outwardly toward one of said end walls, each said rotor side further having a side seal groove extending along the periphery of said rotor side and joining at opposite ends with two of said corner seal holes, an apex seal mounted in each said apex seal slot and extending at opposite ends into the adjoining corner seal holes for engaging said peripheral wall, a side seal mounted in each said side seal groove and extending at opposite ends into the adjoining corner seal holes for engaging one of said end walls, a corner seal mounted in each said corner seal hole for engaging one of said end walls, each said corner seal having a centerline and a periphery engaged by the ends of two adjoining side seals and also having an apex seal slot receiving the adjoining apex seal whereby the corner seal provides a sealed juncture between the adjoining apex seal and two side seals, and a corner seal spring mounted in each said corner seal hole between the inner end of the corner seal and the bottom of the corner seal hole for biasing the corner seal against the respective end wall, each said corner seal spring having a circular edge that closely fits in the corner seal hole to center the spring therein and a U-shape when viewed from the front or back that freely receives the apex seal and a C-shape when viewed from the side that fits between the inner end of the corner seal and the bottom of the corner seal hole, each said corner seal spring having a plurality of engaging portions that engage the inner end of the corner seal on one side of the corner seal spring, each said corner seal spring on the other side having a plurality of engaging portions which engage the bottom of the corner seal hole on the opposite sides of the adjoining apex seal slot in said rotor, all of said engaging portions of said corner seal spring being spaced from and about the centerline of said corner seal so that there is provided balanced off-center loading on the corner seal that does not interfere with corner seal movement, and each of said corner seal springs further having a tang that engages in a hole in the inner end of the corner seal which is eccentrically located relative to the corner seal centerline whereby relative turning between the corner seal spring the corner seal is positively prevented to prevent the corner seal spring from interfering with apex seal movement.

2. In a rotary machine, a housing having an inwardly facing inner peripheral wall and a pair of spaced oppositely facing inner end walls, a rotor rotatably mounted in said housing having sides opposite said end walls and a plurality of corners that remain adjacent said peripheral wall as said rotor rotates, said rotor and said housing walls cooperatively defining a plurality of chambers separated by said rotor corners that expand and contact as said rotor rotates, each said rotor corner having an apex seal slot extending thereacross facing radially outwardly toward said peripheral wall, each said rotor side at each corner having a cylindrical corner seal hole joining with one of said apex seal slots and facing outwardly toward one of said end walls, each said rotor side further having a side seal groove extending along the periphery of said rotor side and joining at opposite ends with two of said corner seal holes, an apex seal mounted in each said apex seal slot and extending at opposite ends into the adjoining corner seal holes for engaging said peripheral wall, a side seal mounted in each said side seal groove and extending at opposite ends into the adjoining corner seal holes for engaging one of said end walls, a cylindrical corner seal mounted in each said corner seal hole for engaging one of said end walls, each said corner seal having a centerline and a periphery engaged by the ends of two adjoining side seals and also having an apex seal slot receiving the adjoining apex seal whereby the corner seal provides a sealed juncture between the adjoining apex seal and two side seals, and a corner seal spring mounted in each said corner seal hole between the inner end of the corner seal and the bottom of the corner seal hole for biasing the corner seal against the respective end wall, each said corner seal spring having a circular edge that closely fits in the corner seal hole to center the spring therein and a U-shape when viewed from the front or back that freely receives the apex seal and a C-shape when viewed from the side that fits between the inner end of the corner seal and the bottom of the corner seal hole, each said corner seal spring having two end portions which are on opposite sides of the apex seal and also having a portion at the crotch of the spring that engage the inner end of the corner seal on one side of the corner seal spring, each said corner seal spring on the other side having two apex portions which engage the bottom of the corner seal hole on the opposite sides of the adjoining apex seal slot in said rotor, the three corner seal engaging portions of each said corner seal spring being at substantially equal radial distances from the corner seal centerline and also substantially equally angularly spaced thereabout and the two corner seal hole bottom engaging portions of each corner seal spring also being substantially equally radially and angularly spaced relative to the corner seal centerline whereby there is provided balanced off-center loading on the corner seal that does not interfere with corner seal movement, and each of said corner seal springs further having a tang that engages in a hole in the inner end of the corner seal which is eccentrically located relative to the corner seal centerline whereby relative turning between the corner seal spring and the corner seal is positively prevented to prevent the corner seal spring from interfering with apex seal movement.

3. In a rotary machine, a housing having an inwardly facing inner peripheral wall and a pair of spaced oppositely facing inner end walls, a rotor rotatably mounted in said housing having sides opposite said end walls and a plurality of corners that remain adjacent said peripheral wall as said rotor rotates, said rotor and said housing walls cooperatively defining a plurality of chambers separated by said rotor corners that expand and contract as said rotor rotates, each said rotor corner having an apex seal slot extending thereacross facing radially outwardly toward said peripheral wall, each said rotor side at each corner having a cylindrical corner seal hole joining with one of said apex seal slots and facing outwardly toward one of said end walls, each said rotor side further having a side seal groove extending along the periphery of said rotor side and joining at opposite ends with two of said corner seal holes, an apex seal mounted in each said apex seal slot and extending at opposite ends into the joining corner seal holes for engaging said peripheral wall, a side seal mounted in each said side seal groove and extending at opposite ends into the adjoining corner seal holes for engaging one of said end walls, a cylindrical corner seal mounted in each said corner seal hole for engaging one of said end walls, each said corner seal having a centerline and a periphery engaged by the ends of two adjoining side seals and also having an apex seal slot receiving the adjoining apex seal whereby the corner seal provides a sealed juncture between the adjoining apex seal and two side seals, and a corner seal spring mounted in each said corner seal hole between the inner end of the corner seal and the bottom of the corner seal hole for biasing the corner seal against the respective end wall, each said corner seal spring being stamped from sheet metal and having a circular edge that closely fits in the corner seal hole to center the spring therein and a U-shape when viewed from the front or back that freely receives the apex seal and a C-shape when viewed from the side that fits between the inner end of the corner seal and bottom of the corner seal hole, each said corner seal spring having two end portions which are on opposite sides of the apex seal and also have a portion at the crotch of the spring that engage the inner end of the corner seal on the concave side of the corner seal spring, each said corner seal spring on the convex other side having two apex portions which engage the bottom of the corner seal hole on the opposite sides of the adjoining apex seal slot in said rotor, the three corner seal engaging portions of each said corner seal spring being at substantially equal radial distances from the corner seal centerline and also substantially equally angularly spaced thereabout and the two corner seal hole bottom engaging portions of each corner seal spring also being substantially equally radially and angularly spaced relative to the corner seal centerline whereby there is provided balanced off-center loading on the corner seal that does not interfere with corner seal movement, and each of said corner seal springs further having a tang that extends parallel to the corner seal centerline and engages in a hole in the inner end of the corner seal which also extends parallel to the corner seal centerline and is eccentrically located relative thereto whereby relative turning between the corner seal spring and the corner seal is positively prevented to prevent the corner seal spring from interfering with apex seal movement.

* * * * *